United States Patent [19]

Gordon, deceased et al.

[11] 4,392,344
[45] Jul. 12, 1983

[54] CHAIN-LINK CABLE CARRIER

[75] Inventors: Edmund A. Gordon, deceased, late of Philadelphia, Pa., by Alvina A. Gordon, and Emma C. Cnudde Administratrices; by John Yaecker, Administrator, North Wales,, Pa.

[73] Assignee: Central Safety Equipment Company, Burlington, N.J.

[21] Appl. No.: 279,080

[22] Filed: Jun. 30, 1981

[51] Int. Cl.³ .............................................. F16G 13/16
[52] U.S. Cl. ........................................ 59/78.1; 248/49; 248/68 R; 464/170; 138/120
[58] Field of Search .................... 59/78.1, 91; 138/120; 464/170, 176, 177; 285/DIG. 22, 325; 403/294; 46/25, 28, 221; 248/49, 51, 52, 68 R, 68 CB, 78

[56] References Cited

U.S. PATENT DOCUMENTS

| | | | |
|---|---|---|---|
| 2,899,159 | 5/1956 | Leblang | 248/49 |
| 3,053,358 | 9/1962 | Gross | 59/78.1 |
| 3,102,609 | 9/1963 | Gerard | 46/25 |
| 3,188,795 | 11/1962 | Ulm | 59/91 |
| 3,284,036 | 11/1966 | Nansel | 248/49 |
| 3,330,105 | 7/1967 | Weber | 59/78.1 |
| 3,448,954 | 6/1969 | Kulandsky | 248/51 |
| 3,664,619 | 5/1972 | Heidrich et al. | 248/51 |
| 3,772,875 | 11/1973 | Viano | 59/78.1 |
| 3,779,033 | 12/1973 | Boissevain | 59/78.1 |
| 3,921,388 | 11/1975 | Loos et al. | 59/78.1 |
| 4,186,555 | 2/1980 | Fitchett | 59/78.1 |
| 4,373,324 | 2/1983 | Janos | 59/78.1 |

FOREIGN PATENT DOCUMENTS 1270041 of 0000 France .
821182 of 0000 United Kingdom .

Primary Examiner—Lowell A. Larson
Assistant Examiner—David B. Jones
Attorney, Agent, or Firm—Albert L. Free

[57] ABSTRACT

A cable carrier providing substantially complete enclosure of a cable or the like is made up of pivoted, partially-overlapping, hollow rectangular links provided with stop means limiting the degree of flexing permitted in either angular sense. Sheet-like joint closures extend between adjacent links and into pockets at each end of each link, and close the openings otherwise formed between adjacent links when they are pivoted out of alignment.

7 Claims, 13 Drawing Figures

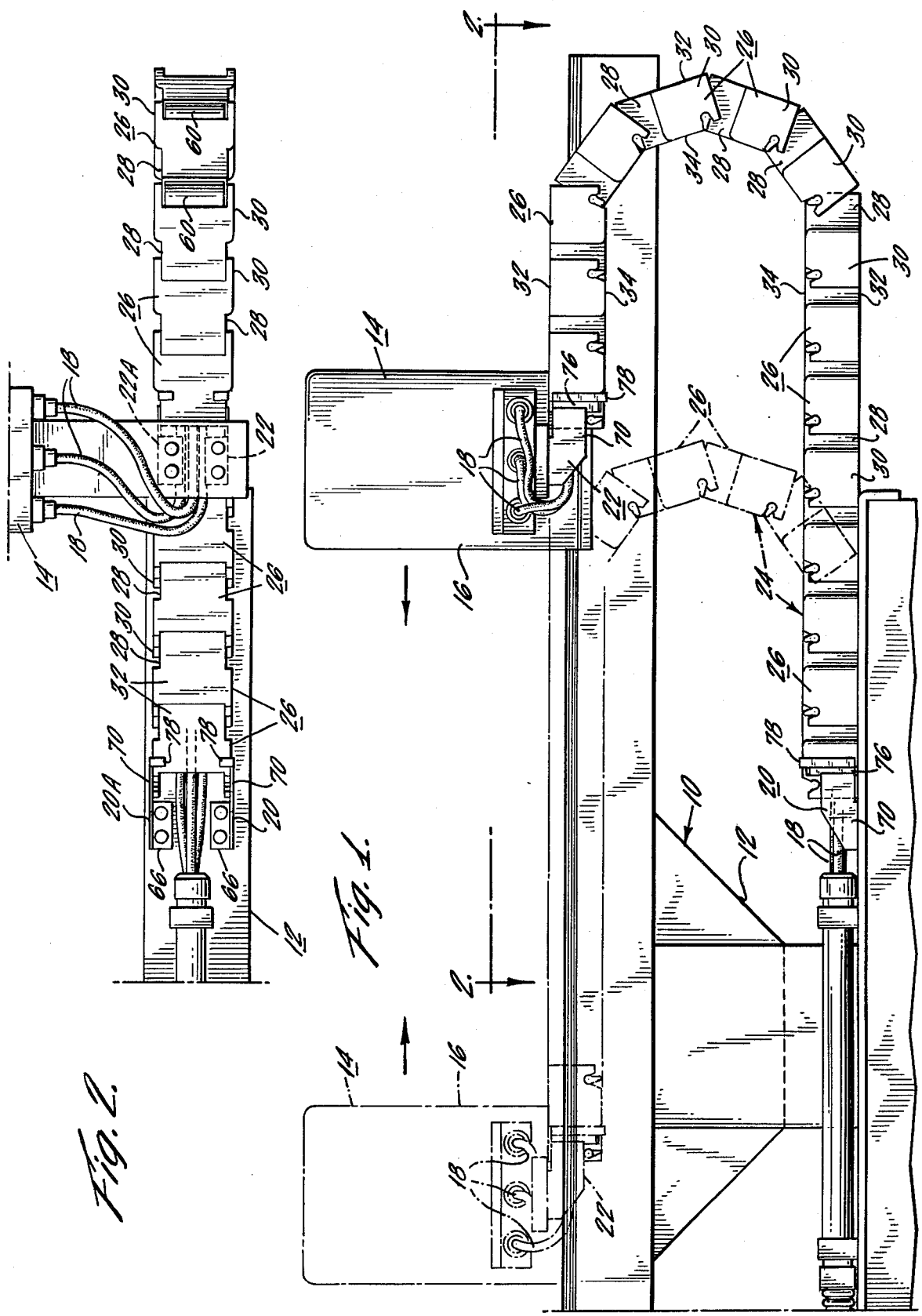

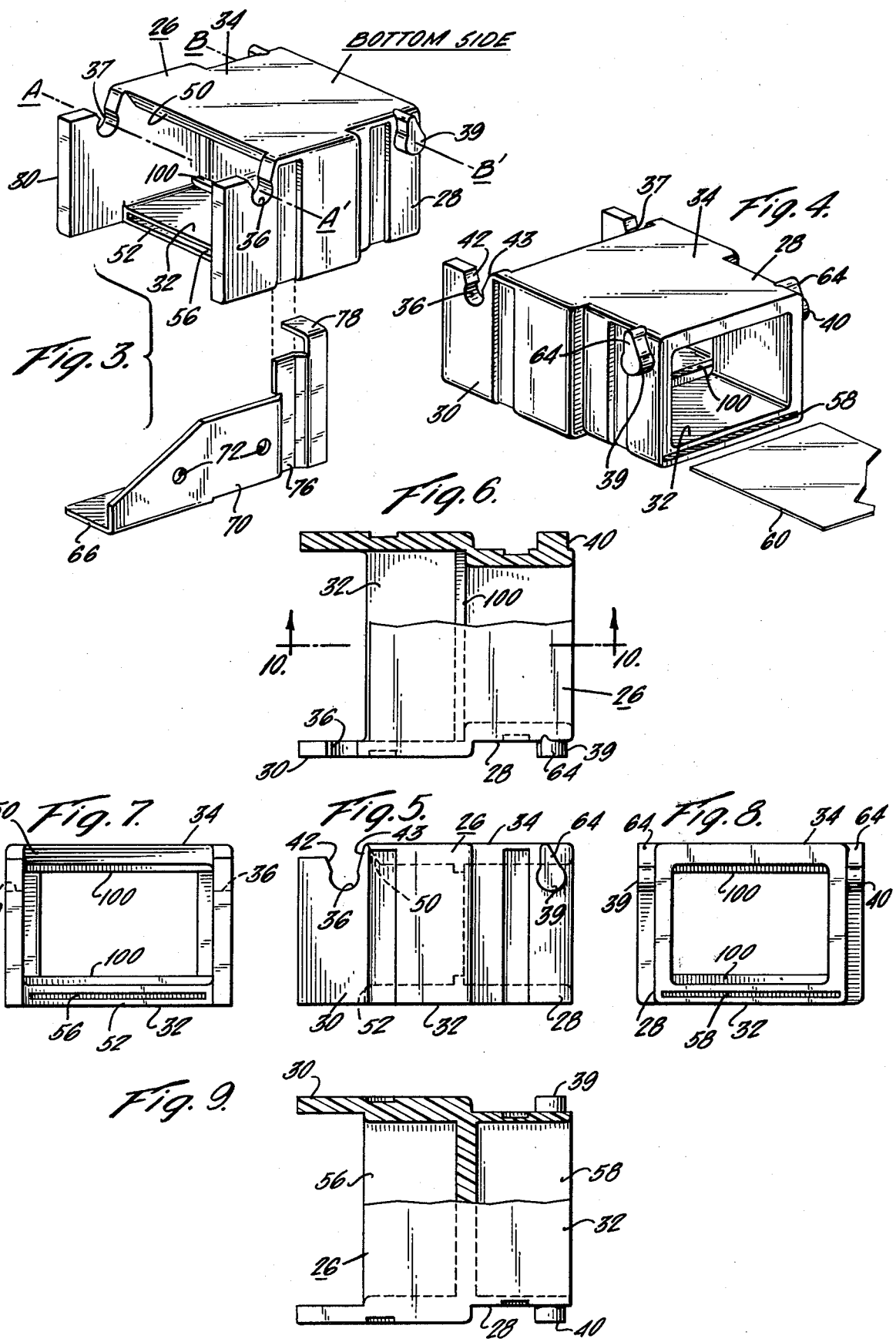

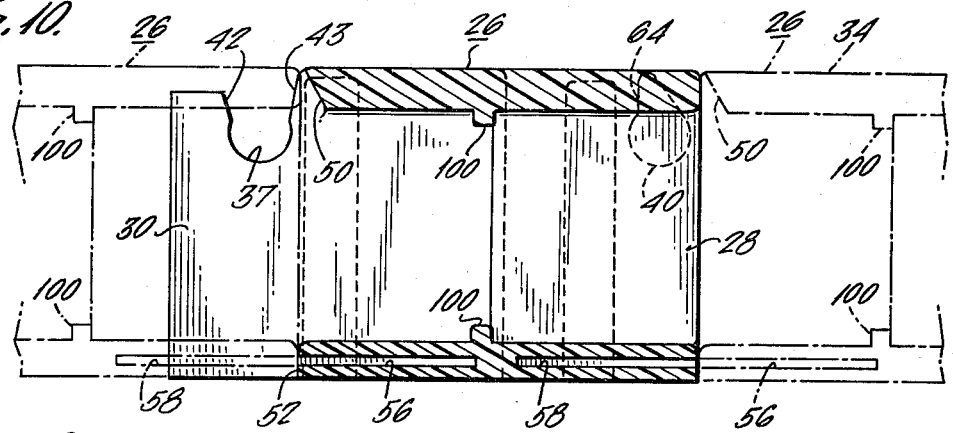
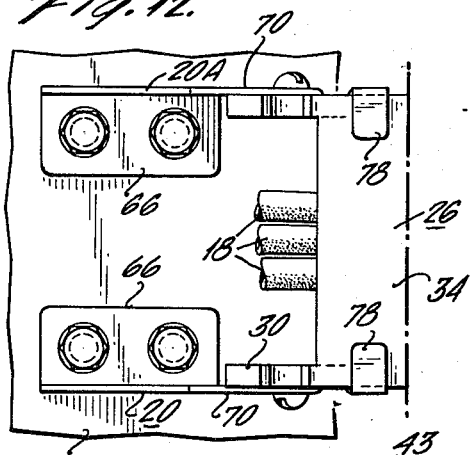
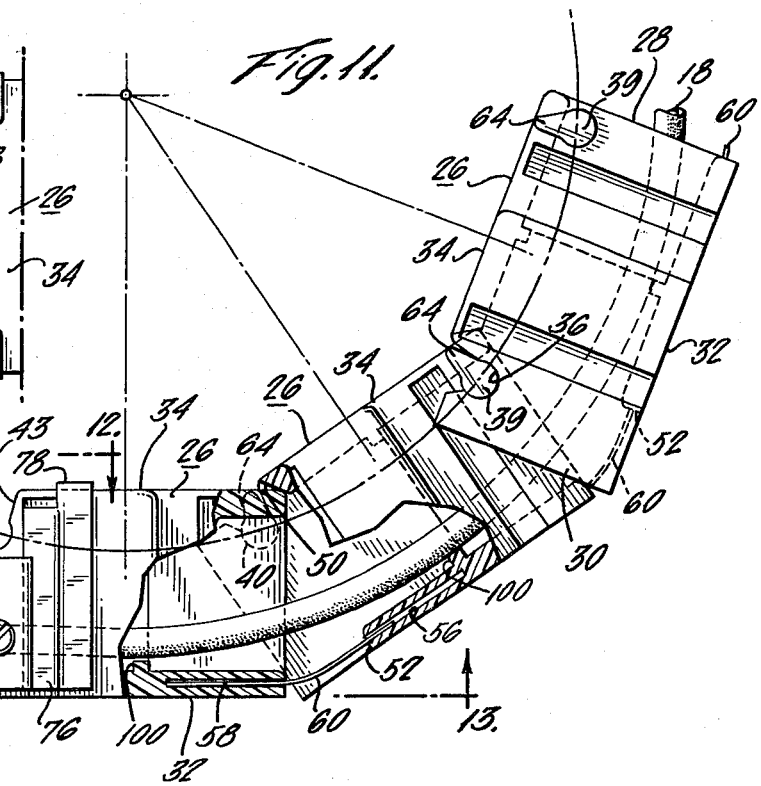
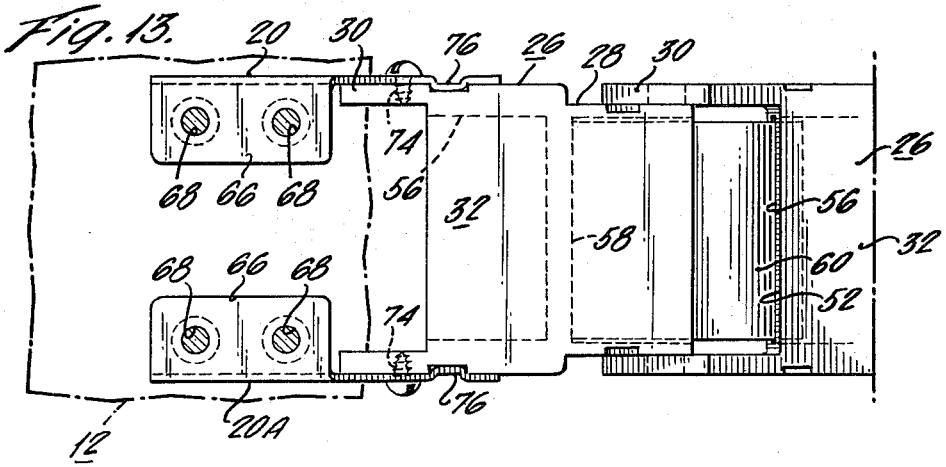

CHAIN-LINK CABLE CARRIER

BACKGROUND OF THE INVENTION

This invention relates to chain-link types of cable carriers, usable for example for surrounding, carrying and protecting flexible conduits of air, hydraulic fluid, or electricity; typically such carriers are used to contain wires, electrical cables or hoses for conveying fluids. As used herein, the term "cable" will be understood to include any elongated flexible object or group of objects which is to be contained within, and extend along the length of, the interior of the cable carrier.

Such carriers typically comprise a plurality of "links" pivotally connected to each other end-to-end in a series chain, so that each link can be articulated or pivoted with respect to its neighbor and the carrier thereby enabled to flex easily and assume various curvilinear configurations, at least in a given plane of flexing, so as to accommodate corresponding required flexure of the flexible cable. In one typical application of the invention, for example, one end of the cable carrier may be clamped to a stationary portion of a metal-working machine and the other end secured to a reciprocating part of the machine which moves in the plane in which the cable carrier is designed to flex; an electrical cable which is necessary to the operation of the machine may extend between the stationary and reciprocating parts thereof, and passes through the cable carrier so as to be protected by it and held from pivoting randomly sideways.

Various types of cable carriers have been proposed in the past, some of which have found use. See for example the following U.S. Pat. Nos.: 3,772,875 issued Nov. 20, 1973 to L. Viano; 3,921,388 issued Nov. 25, 1975 to K. Loos; 3,664,619 issued May 23, 1972 to K. Heidrich et al.; 3,448,954 issued June 10, 1969 to S. Kurlandsky; 3,053,358 issued Sept. 11, 1962 to A. Gross; 3,188,795 issued June 15, 1965 to R. Ulm; 3,779,003 issued Dec. 18, 1973 to M. Boissevain et al.; 3,284,036 issued Nov. 8, 1966 to H. Nansel; 2,899,159 issued May 28, 1956 to W. Leblang; as well as French Pat. No. 1,270,041 issued July 17, 1961 to E. Constantin and British Pat. No. 821,182 issued Sept. 30, 1956 to M. Manne.

In a cable carrier it is often desirable to enclose the carried cable substantially completely, in all of its flexed and unflexed configurations. For example, the cable and carrier may be used in an environment in which metal shavings are present in the immediate ambient, which if they enter partly or completely into the carrier may damage the cable or interfere with operation of the carrier.

It is also desirable in general that the interior of the carrier be quite smooth, so as to permit easy relative motion between cable and carrier without damage to the cable or carrier during flexing.

Also, it often occurs that pinch points exist at one or more positions along the inside of the carrier, at which points the cable may be subjected to substantial pinching effect due to articulation between the links, particularly in the regions between the links. Elimination or minimization of such pinch points is of course also highly desirable.

It is further desirable in many applications to limit the angle of pivot between adjacent links, usually in both directions. Thus, it is usual that the cable is to be bent or flexed from its normal unstressed configuration only to a limited extent, lest it be permanently deformed, broken from fatigue due to repetitive overflexing, or bent so sharply in the case of a fluid-conveying conduit that the desired flow may be cut off or greatly reduced by undue flexing of the conduit. In certain applications it is also desirable that the limit of articulation in one direction be at or about 0°, whereby the carrier will assume a substantially straight-line configuration at one extreme of flexure, with all of the permitted flexing of the carrier being in one angular sense only. An arrangement of this type will be described in detail hereinafter.

In general, it is also usually desirable that the links be easy and inexpensive to fabricate and easily assembled to, and disassembled from, their neighbors, so that different lengths of the chain type carrier can be readily provided for different applications.

The problem of maintaining a substantially complete enclosure of the cable within the carrier is particularly difficult to overcome, since the articulation of one link with respect to its neighbor typically causes one link to pivot away from its neighbor, leaving a very substantial gap which exposes the interior to harmful ambient materials and conditions.

It is therefore an object of the present invention to provide a new and useful chain-link cable carrier, and a new and useful form of link for use therein.

A further object is to provide such carrier and link which provide substantially complete enclosure of the cable contained therein, even when it is flexed.

Another object is to provide such carrier and link which minimize the chances of pinching of the cable when the carrier is flexed.

A still further object is to provide a cable carrier and link which presents a substantially smooth interior to the cable therein.

A further object is to provide such a cable carrier and link which can be molded in one piece.

It is also an object to provide a cable carrier and link in which the links can readily be assembled to, or disassembled from, each other.

Another object is to provide such cable carrier and link which provide predetermined limits for the flexing thereof in both directions of angular flexing.

It is also an object to provide such flexing limits so that flexing in one angular direction is limited at about 0°, in which position the links are arranged along a substantially straight line configuration.

BRIEF SUMMARY OF THE INVENTION

These and other objects and features of the invention are achieved by providing a cable carrier and link using one or more of the following features. Each link is tubular, preferably generally rectangular with open ends, and preferably is molded of plastic in one piece. Each link is pivotally mounted to its neighbor, preferably by means of a pair of integrally molded bosses extending outwardly from each link near the top thereof and along an axis at right angles to the longitudinal axis of the link, adjacent one end of each link, and by means of a corresponding pair of openings in the side walls at the opposite end of each link into which the bosses of a neighboring link can be manually snapped.

Preferably, adjacent links overlap to some extent, in the sense that one end of each link is narrower than its other end, whereby the smaller end of one link is inserted between the side walls of the wider end of the adjacent link, as is permitted by recessing of the top and bottom of the wider end of each link. Flexing of the carrier in one angular direction is limited by abutment of the top of the narrower end of each link against the bottom of the recess in the top of the wider end of its neighbor, preferably to provide a limit at about 0 angle of flex between links and thus hold the lower run of the carrier in an approximately straight line configuration. Limiting of flexure in the opposite direction is preferable provided by abutment of wedge-shaped extensions of the pivot bosses against specially shaped side surfaces of the sidewall recesses in which they are located.

The openings between the tops of adjacent links when they are pivoted from their zero-angle positions are closed by joint closures, each extending between the tops of adjacent pairs of links, and each preferably having the form of a sheet of spring metal such as stainless steel, opposite ends of which are slideably sheathed in narrow slot-like pockets provided at each end of the top of each link. As any two adjacent links are pivoted apart, the surfaces of one or both of the pockets slide over opposite ends of the joint closure, which then bridges the gap between the adjacent links.

BRIEF DESCRIPTION OF FIGURES

These and other objects and features of the invention will be more readily understood from a consideration of the following detailed description, taken with the accompanying drawings, in which:

FIG. 1 is a side view of apparatus using the cable carrier and link of the invention, with an alternate working position of the apparatus shown in broken line;

FIG. 2 is a top view of the apparatus of FIG. 1, as viewed along direction 2—2;

FIG. 3 is an exploded perspective view showing one end link and one terminal fastener for securing one end of the carrier;

FIG. 4 is a perspective view of the link, showing the closure member positioned for insertion into a corresponding pocket in the link;

FIG. 5 is a side view of a link according to the invention;

FIG. 6 is a view looking downward on the same link, with parts broken away;

FIG. 7 is a view of one end thereof;

FIG. 8 is a view of the opposite end of the link; and

FIG. 9 is a view looking upward at link 26 with parts broken away;

FIG. 10 is a sectional view taken along lines 10—10 of FIG. 6, with adjacent links shown in broken line;

FIG. 11 is an enlarged and more detailed view of the lower end of the cable carrier of FIG. 1, with a terminal fastener secured in place;

FIG. 12 is a view taken along lines 12—12 of FIG. 11; and

FIG. 13 is a view taken along lines 13—13 of FIG. 12.

DETAILED DESCRIPTION OF SPECIFIC EMBODIMENTS

Without thereby in any way limiting the scope of the invention, the following description of preferred embodiments is provided by way of example only.

Referring first to FIGS. 1 and 2 particularly, there is illustrated a part of a metal working machine 10, such as a lathe, having a stationary bottom portion 12 and a reciprocable portion 14. In this example the reciprocable portion 14 may carry a control unit 16, and a cable 18 of three wires extends from a fixed terminal fastener 20,20A on the stationary bottom portion of the machine to the reciprocable terminal fastener 22,22A mounted on reciprocable portion 14 of the machine. It will be understood that at its fixed end the cable extends to some suitable source of electrical power (not shown), and at its reciprocable end the three wires thereof deliver operating electrical power to the control unit 16 for any purpose connected with operation of the machine. Again, it will be understood that in some cases the cable 18 will comprise one or more conduits for hydraulic or pneumatic fluid, rather than electrical wires.

The cable 18 is covered and surrounded by the cable carrier 24 for its entire length between the fixed terminal fastener 20,20A and the reciprocable terminal fastener 22,22A. As shown, the carrier 24 contains a 180° bend; the lower run of the identical set of carrier links such as 26 extends horizontally to the right in FIG. 1, and the upper run of links extends in the opposite direction, with five intermediate links pivoted at about 36° to each other providing the desired 180° bend.

It is noted that when the reciprocable portion 14 of the machine is moved from the position shown in full line to that shown in broken line in FIG. 1, the curvature provided by the intermediate links remains constant, and for each link on the bottom run which is lifted upwardly by reciprocating motion, an additional link is added to the upper run, and vice versa. Thus, the motion is similar to that in the usual crawler tractor, except that there is no sprocket supporting the inner side of the carrier loop.

While it is contemplated that the stationary portion of the machine can provide a bottom support for the lower run of links in the cable carrier, the cable carrier in this embodiment is advantageously designed so that adjacent links of the carrier cannot pivot substantially beyond the 0° angle in the downward direction along the lower run of links, and the lower run, once securely fastened at its stationary end, can therefore maintain itself projecting outward in cantilever fashion to a substantial distance without the necessity for providing an underlying support, although when made very long it will typically exhibit appreciable downward deflection if not supported.

Considering now the remaining FIGS. 3–13 showing the link and carrier in greater detail, as illustrated the link shown is assumed to be one in the lower run in FIG. 1, so that the upwardly-presented surface of the link in FIGS. 3 and 4 is actually its bottom side; that is, the top of a link as the term is used herein means that side corresponding to the uppermost side of a link in the top run in FIG. 1.

Referring particularly to FIGS. 3–9, the link 26 in this example is a single integral molded plastic piece and is rectangular in both longitudinal and transverse section. It is of hollow tubular form, and the cable extends freely through the central opening thereof when in use. The link 26 has a narrower end 28 and a wider end 30 such that the narrower end of one link can fit closely within the side walls of the wider end of another link, as shown for example in FIG. 13. It is noted that the top 32 of each link is recessed or cut back, as is the bottom 34 thereof, so that the narrower end of the adjacent link can enter and be overlapped by the wider end of the link.

Pivot means are provided adjacent each end of each link to provide the desired pivoting action between adjacent links. More particularly, a pair of parti-circular openings 36 and 37 are provided near the bottoms of the side walls of each link adjacent one end thereof, to establish a pivot axis A–A' extending along the axes of the openings at right angles to the longitudinal axis of the link, as shown for example in FIG. 3. Axis A–A' is positioned beneath the recess in the top of the link, and the pivot openings 36 and 37 extend to the tops of the respective side walls thereof as shown.

Near the opposite, narrower end of the link there is provided a pair of laterally extending pivot bosses 39,40 establishing a pivot axis B–B' as shown in FIG. 3, these bosses being molded integrally with the body of the link. The axis B–B' is parallel to, and at the same height as, the axis A–A', so that when the pivot bosses of one link are placed in the pivot openings of an adjacent link, the tops and bottoms of the adjacent links lie in the same horizontal plane when the carrier is in a horizontal position. The external surfaces of the bosses are cylindrical, as are the interior surfaces of the opening such as 36,37, and openings 36,37 preferably extend slightly more than semicircularly so as to present some resistance to sliding of the bosses into them, thereby providing a snap action for easily assembling the bosses into the openings while preventing them from coming apart during use. The links can also be snapped apart, and thus any number of them can readily be assembled or disassembled from others to provide any desired length of cable carrier. To facilitate this action, the side-surface portions 42,43 of the pivot openings 36 and 37 diverge from each other along the upward direction to present no impediment to the insertion of the bosses therein.

The pivot means are so located that when one link such as 26 is assembled to another, and the links lie in a straight-line configuration, the bottom of the narrower end of one link lies adjacent the inwardly-bevelled edge 50 of the bottom of the adjacent link, while the top of the narrower end of the neighboring link abuts against the top 52 of the recess in the top of link 26 to prevent pivoting of the adjacent links downwardly beyond the zero angle position. The bevelling at 50 permits the bottom edge of the adjacent link to pivot inwardly into the wider end of link 26 when adjacent links are articulated with respect to each other. The relationship of the links in the horizontal position of the carrier is shown particularly clearly in FIGS. 10, while the pivoted or flexed condition of the carrier is illustrated particularly clearly in FIG. 11.

Further, a pair of narrow rectangular pockets 56 and 58 are provided within the opposite ends of the top of each link, for receiving joint closure members such as 60, opposite ends of which are inserted within adjacent pockets of adjacent links as shown particularly clearly in FIG. 11. Joint closure 60 is preferably of a flexible but self-supporting material such as tempered stainless steel, and is placed in position in the pockets when one link is assembled to the next. In the straight-line configuration of the cable carrier, the joint closure has a flat configuration; when the cable is flexed as in FIG. 11, it bends to accommodate the flexing and slides in one or both of the pockets so as to remain retained therein, as is assured by appropriate selection of the length of the joint closure with respect to the depths of the pockets and with respect to the maximum permitted angle of flexing of one link with respect to its neighbor. Accordingly, when the cable carrier is flexed as shown in FIG. 11, the openings which would otherwise exist between the tops of adjacent links is closed by the closure member to minimize exposure of the interiorly carried cable to the surrounding ambient and to minimize any possible pinching action when the flexed carrier is restraightened.

It is noted that each of the pivot bosses is provided at its upper side with a wedge-like extension such as 64, in this example directed somewhat inwardly from vertical (to the left of vertical in FIGS. 3–13), and is shaped and positioned so as to permit pivoting of the adjacent links freely to and from their 0° position in which the carrier extends in a substantially straight line, while limiting the upward angular pivoting of each link with respect to its neighbor to about 36°. This is shown for example in FIG. 11, wherein the links are shown pivoted to the maximum permitted extent, the right-hand side of the wedge of each boss then abutting against the adjacent side of the corresponding pivot opening so it cannot rotate further, thus assuring that excessive flexing of the carrier, and of the cable therein, cannot occur and providing a predetermined minimum radius of curvature of the carrier and cable.

FIGS. 1, 11 and 13 illustrate particularly the manner in which each end of the carrier may be secured to its corresponding mounting surface. Thus at one end of the carrier there is provided a split terminal fastener having two parts 20 and 20a, each in the form of a mounting bracket having a horizontal mounting surface 66 provided with appropriate screw mounting holes 68 and a vertical flange portion 70 having mounting holes such as 72 through which a short screw can be inserted into corresponding tapped openings such as 74 in the side walls of the larger end of the terminal link for the bottom run of links. In this example, vertical rectangular depressions are moulded into each side of the larger end of each link, and the vertical flange portion 70 of the fastener is provided with a correspondingly-shaped inwardly-positioned portion 76 extending into the rectangular recess to provide an affirmative locking action. One end of each vertical flange portion is preferably bent inwardly at right angles at the top, so it extends closely around the top edge of the link which it secures, as at 78.

The other terminal fastener 22,22a of FIG. 1 is of directly analogous construction, except that its side flanges are positioned to accommodate and fit into corresponding recesses in the side walls of the narrower end of the opposite terminal link.

Accordingly, it will be seen that there has been provided a cable carrier which is particularly adapted to be made inexpensively as a single molded plastic piece of tubular form with relatively smooth inner surfaces, which is provided with limits of angular flexing for both directions of angular motion, and which is easily assembled and disassembled by snap action of one link to the other. Importantly, the joint closure arrangement and the overlapping of the adjacent links provides substantially complete closure of the interior of the cable carrier from the surrounding ambient for any permitted position of articulation of the carrier, and also minimizes pinch points for the cable.

When two cables are to be passed through the carrier, it is contemplated that a divider of a springy plastic material may be snapped into place over the internal transverse ridges such as 100 in each link to define a pair of laterally-separated openings extending through the divider, one opening for each cable.

While the invention has been described with reference to specific embodiments thereof in the interest of complete definiteness, it will be understood that it can be embodied in a variety of forms diverse from those specifically shown and described, without departing from the spirit and scope of the invention as defined by the appended claims.

It is claimed:

1. A chain-link type of cable carrier suitable for holding electrical cables, wires, hoses or the like, comprising:
   a plurality of links pivotally connected to each other end-to-end in a series chain;
   each of said links being of integral tubular plastic construction, having a substantially rectangular cross-section at least adjacent its opposite ends to form a box having open ends, and comprising pivot means adjacent each of said opposite ends thereof for providing pivotal connection of each link to immediately adjacent links in said chain;
   one end of each of said links being narrower than its other wider end and the top and bottom of each link having recesses therein adjacent said other end for receiving between its side walls said narrower end of the adjacent link;
   said pivot means of each said link being positioned adjacent but inboard of said opposite end thereof, the pivot axes of said pivot means extending at right angles to said side walls so that when said each link is pivoted about one of its pivot axes in one sense with respect to the immediately adjacent link into which it extends, its pivoting is limited by abutment of the top of said narrower end of each said link against the recessed top of the adjacent link, with the top surfaces of said each link and said adjacent link aligned with each other;
   said pivot means comprising stop means for limiting pivoting of said each link with respect to said immediately adjacent link in the opposite sense at a predetermined angular position to define the minumum permitted radius of curvature of said carrier along its longitudinal axis; and
   said links when pivoted toward said predetermined angular position producing an opening between the top surfaces of adjacent links.

2. The cable carrier of claim 1, comprising a plurality of closure sheets extending between said links near the tops thereof for closing said openings between links, said links comprising slot means each having an open side at each end of each link for receiving and slideably sheathing opposite ends of said closure sheets.

3. The cable carrier of claim 1, wherein:
   each said pivot means comprising two part-circular bosses extending outwardly from the sides of said each link adjacent said narrower end thereof, and aligned with each other, and two parti-circular openings through opposite sidewalls of said each link adjacent said wider end thereof for pivotally receiving the parti-circular bosses of the next adjacent link.

4. The cable carrier of claim 1, wherein:
   each of said part-circular openings is slightly more than semi-circular at its lower end and extends divergingly to the top of said sidewalls of said each link, whereby the corresponding bosses of the next adjacent link can be snapped into and out of said openings.

5. A chain-link type of cable carrier suitable for holding electrical cables, wires, hoses or the like, comprising a plurality of hollow links pivotally connected to each other in a series chain;
   each link of said chain being in the form of an open-ended box having a pair of pockets each adjacent one end of said link near its top, each of said pockets having an open end facing toward the adjacent end of its associated link and having a closed bottom opposite from said open end; and
   joint closure means extending between the adjacent ends of adjacent links in said chain, with its opposite ends extending into the adjacent confronting pockets of said adjacent links, whereby upon pivoting of one of said links with respect to an adjacent link about an axis such as to separate the bottom of said adjacent links from each other, said joint closure means covers the spacing between the tops of said adjacent pvioted links.

6. The carrier of claim 5, wherein said joint closure means is a thin sheet of flexible material loosely captured in adjacent pockets of adjacent links.

7. The carrier of claim 6, wherein said sheet is of tempered stainless steel.

* * * * *